(12) United States Patent
Oster et al.

(10) Patent No.: US 10,488,461 B2
(45) Date of Patent: Nov. 26, 2019

(54) DIGITAL INTEGRATED CIRCUIT PROTECTED FROM TRANSIENT ERRORS

(71) Applicant: THALES, Courbevoie (FR)

(72) Inventors: Yann Nicolas Pierre Oster, Toulouse (FR); Loïc Barres, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/954,439

(22) Filed: Apr. 16, 2018

(65) Prior Publication Data

US 2018/0306860 A1 Oct. 25, 2018

(30) Foreign Application Priority Data

Apr. 20, 2017 (FR) ..................................... 17 00443

(51) Int. Cl.
| | | |
|---|---|---|
| *G01R 31/317* | (2006.01) | |
| *G06F 11/16* | (2006.01) | |
| *G01R 31/3185* | (2006.01) | |
| *H03K 19/177* | (2006.01) | |
| *H03K 19/007* | (2006.01) | |

(Continued)

(52) U.S. Cl.
CPC ... *G01R 31/31703* (2013.01); *G01R 31/3177* (2013.01); *G01R 31/31725* (2013.01); *G01R 31/318519* (2013.01); *G06F 11/16* (2013.01); *G06F 11/1629* (2013.01); *G06F 17/5027* (2013.01); *G06F 17/5054* (2013.01);
(Continued)

(58) Field of Classification Search
CPC ........ G01R 31/31703; G01R 31/31725; G01R 31/3177; G01R 31/318519; G06F 11/16; G06F 11/1629; G06F 17/5027; G06F 17/5054; G06F 21/76; H03K 19/007; H03K 19/17764
USPC .................................. 714/735, 702, 725, 724
See application file for complete search history.

(56) References Cited

U.S. PATENT DOCUMENTS

| | | | | |
|---|---|---|---|---|
| 4,527,237 A | * | 7/1985 | Frieder ............... | G06F 11/2736 709/253 |
| 5,977,791 A | * | 11/1999 | Veenstra ............ | H03K 19/1776 326/40 |

(Continued)

OTHER PUBLICATIONS

Carstens, Multiple FIFO in a Single RAM, May 25, 2006, IP.com, IP.com No. IPCOM000135810D, pp. 1-2. (Year: 2006).*

(Continued)

*Primary Examiner* — John J Tabone, Jr.
(74) *Attorney, Agent, or Firm* — Baker & Hostetler LLP

(57) ABSTRACT

A digital integrated circuit comprising a logic array comprises a functional logic block, a logic unit for detecting transient errors affecting the functional logic block, an input FIFO memory for supplying the functional logic block with samples, an output FIFO memory for receiving samples output from the functional logic block, a buffer memory that is supplied with samples by the input FIFO memory, and a logic control unit that is able to control read access to the input FIFO memory and write access to the output FIFO memory and that is configured, when an error is detected by the transient-error-detecting logic unit, to reset the transient-error-detecting logic unit and the functional logic block, to suspend write access to the output FIFO memory and to switch the input of the functional logic block to the output of the buffer memory.

16 Claims, 6 Drawing Sheets

(51) Int. Cl.
*G06F 17/50* (2006.01)
*G06F 21/76* (2013.01)
*G01R 31/3177* (2006.01)

(52) U.S. Cl.
CPC ............ *G06F 21/76* (2013.01); *H03K 19/007* (2013.01); *H03K 19/17764* (2013.01)

(56) References Cited

U.S. PATENT DOCUMENTS

| | | | |
|---|---|---|---|
| 6,118,724 A * | 9/2000 | Higginbottom | G11C 7/1018 365/189.02 |
| 6,934,198 B1 * | 8/2005 | Lowe | G06F 5/14 365/189.05 |
| 6,956,776 B1 * | 10/2005 | Lowe | G06F 5/14 365/189.05 |
| 7,701,247 B1 * | 4/2010 | Nelson | G06F 11/1076 326/38 |
| 8,127,089 B1 * | 2/2012 | Nguyen | G06F 3/061 710/52 |
| 9,575,862 B1 | 2/2017 | Hutton et al. | |
| 2004/0219739 A1 * | 11/2004 | Nicolaidis | G06F 9/3861 438/232 |
| 2011/0022903 A1 | 1/2011 | Grimonpont et al. | |
| 2011/0029830 A1 * | 2/2011 | Miller | G06F 11/221 714/734 |
| 2015/0234008 A1 * | 8/2015 | Miller | G01R 31/3177 714/734 |

OTHER PUBLICATIONS

Frédéric Amiel et al., "Power consumption improvement with residue code for fault tolerance on SRAM FPGA," ISEP.

F. Gusmao de Lima Kastensmidt et al., "Designing fault-tolerant techniques for SRAM-based FPGAs," IEEE Design & Test of Computers, Nov.-Dec. 2004, pp. 552-562.

\* cited by examiner

DIGITAL INTEGRATED CIRCUIT PROTECTED FROM TRANSIENT ERRORS

CROSS-REFERENCE TO RELATED APPLICATIONS

This application claims priority to foreign French patent application No. FR 1700443, filed on Apr. 20, 2017, the disclosure of which is incorporated by reference in its entirety.

FIELD OF THE INVENTION

The invention relates to the field of digital integrated circuits, for example programmable logic circuits such as field programmable gate arrays (FPGAs) or application specific integrated circuits (ASICs).

More precisely, the invention relates to a digital integrated circuit that incorporates a mechanism for protecting from transient errors.

BACKGROUND

Digital integrated circuits may be subjected to ionizing particles or radiations that generate transient errors in the circuit and disrupt its nominal operation.

In the case of airborne or aerospace applications, digital integrated circuits are exposed to the effects of ionizing radiation originating from the exterior environment. To a lesser extent, even in applications integrated into ground systems, the packages in which the circuits are encapsulated generate alpha radiations that create errors at a rate that increases as the complexity of the circuits and the number of logic gates that they contain increases.

The effects of radiations on a circuit may be cumulative or single-event. In the first case, the defects generated by the radiations gradually accumulate until, above a certain total dose threshold, logic errors are generated. In the second case, a single ionizing particle or a single event may generate an immediate defect that may affect the memories, flip-flops or logic gates that the circuit contains. If the defect generates an inversion of one bit, a single event upset (SEU) is spoken of, whereas, in contrast, if the defect affects a plurality of bits, a multiple-bit upset (MBU) is spoken of. The effects of radiations may take the form of pulses or parasitic signals that propagate through the circuit and affect combinational logic via their presence on an electric wire or a logic gate (a single event transient (SET) is spoken of in this case). These errors (SEU, MBU, SET) are reversible and in combinational and sequential logic affect only the interpretation of electrical signals, the net result being logic errors that affect the circuit.

The problem addressed by the invention is that of protecting a digital circuit from reversible errors produced by radiations, without excessively penalizing the complexity of the logic of the circuit and power dissipation, in a way that is transparent for the service provided or mission accomplished by the circuit, in particular as regards the rhythm of execution of processing operations, and in particular without service interruption.

A plurality of solutions allowing the effects of radiation on a digital integrated circuit to be combated are known.

A first solution consists in using metal shielding to limit the interaction of ionizing radiation or particles with the substrate of the chip of the integrated circuit. For reasons of bulk and weight, the thickness of the shielding must however remain small, this preventing the circuit from being completely protected from transient errors. Thus, this first solution proves to be unsatisfactory.

A second solution consists in using a silicon-on-insulator (SOI) technology instead of raw silicon to produce the integrated circuit. This technology allows transient errors to be decreased by virtue of the use of highly resistive substrates, however it results in a higher manufacturing cost without completely preventing the effects of radiation.

A third known solution is based on the use of a specific library of logic gates that intrinsically incorporates a certain level of redundancy by virtue of a specific design of the logic gates. This solution depends on the integrated-circuit manufacturer and corresponds to one particular technology. In order to make the logic tolerant to parasitic pulses, the design of the logic gates allows for higher margins in the design of the transistors (higher capacitances and slower rise times) and cells for filtering parasitic pulses and redundancies in looped structures. One drawback of this solution is that it is specific to a given type of technology and thus its range of application is limited, and its performance level is less high. Specifically, integrating redundancy into the logic structures increases the amount of space occupied, increases power consumption and lowers execution speed.

Another solution consists in implementing redundancy at the functional level of the circuit, of its architecture. For example, it is known to protect the content of memories using codes for detecting and correcting errors such as the extended Hamming code.

With regard to protecting the logic gates of a circuit, the triple-modular-redundancy (TMR) technique is also known, which allows an error on one instance of a function among a set of three instances of the same function operating in parallel to be corrected. This principle may be applied to a flip-flop or to a combinational logic array or even to a function. It allows sequential logic and combinational logic to be protected from an error occurring on one of the three instances. In contrast, if two errors occur simultaneously on two instances, they cannot be corrected. Moreover, one drawback of this solution is that it is very costly in terms of logic complexity and of power dissipation.

The techniques for detecting and correcting transient errors described in the article "Power consumption improvement with residue code for fault tolerance on SRAM FPGA, Frédéric Amiel et. al, ISEP" are also known. This article presents methods for detecting and correcting transient errors via replication of the function and comparison of the results, and methods for detecting errors via modulo projection of the function and comparison of the results.

The article "Designing fault-tolerant techniques for SRAM-based FPGAs, F. Gusmao de Lima Kastensmidt, IEEE design & test of computers", which presents the effect of radiation on FPGA SRAM integrated circuits and a conventional mode of protection via triple modular redundancy (TMR), is also known. This article also proposes a technique for protecting combinational logic that is less costly than the TMR method with:

replication of combinational circuits for the purposes of error detection;

modification of these circuits in order to allow, in case of error, the calculation to be replayed in an additional cycle on the basis of post-encoding operands, the result being decoded then compared with the first result in order to identify which instance among the two is erroneous.

The sequential logic remains protected by the TMR method.

This protection technique has the drawback of being too costly in terms of logic resources because of the profound modification of the entire combinational logic and of the use of the TMR method to protect the flip-flops, and of significantly decreasing the speed of the circuits.

The invention aims to solve the limitations of the aforementioned prior-art solutions by providing a solution for protecting a digital integrated circuit that is of low complexity and that allows all the logic resources of a function implemented by a circuit to be protected without interrupting the service and without any impact on the rhythm of execution of the function such as observable from the input and output interfaces.

SUMMARY OF THE INVENTION

The subject of the invention is a digital integrated circuit comprising a logic array comprising a functional logic block, a logic unit for detecting transient errors affecting the functional logic block, an input FIFO memory for supplying the functional logic block with samples, an output FIFO memory for receiving samples output from the functional logic block, a buffer memory that is supplied with samples by the input FIFO memory, and a logic control unit that is able to control read access to the input FIFO memory and write access to the output FIFO memory and that is configured, when an error is detected by the transient-error-detecting logic unit, to reset the transient-error-detecting logic unit and the functional logic block, to suspend write access to the output FIFO memory and to switch the input of the functional logic block to the output of the buffer memory.

According to one particular aspect, the digital integrated circuit according to the invention comprises a multiplexer for connecting the input of the functional logic block to the input FIFO memory or to the buffer memory.

According to one particular aspect of the invention, the logic control unit is configured to control the multiplexer depending on the result of the error-detecting logic unit.

According to one particular aspect of the invention, the frequency of the clock within the logic array is higher than the average write frequency in the input FIFO memory.

According to one particular aspect of the invention, the activity within the logic array is made irregular.

According to one particular aspect of the invention, the rhythm Ra of the processing operations within the logic array is controlled by the logic control unit by means of an activation signal.

According to one particular aspect of the invention, the rhythm Ra of the processing operations within the logic array is controlled by the logic control unit depending on the fill level of the output FIFO memory or on whether or not the transient-error-detecting logic unit has signalled that it has detected an error.

According to one particular aspect of the invention, the logic control unit is configured to modify the rhythm Ra of the processing operations within the logic array depending on a comparison of the fill level of the output FIFO memory to at least three thresholds.

According to one particular aspect of the invention, the input FIFO memory and the output FIFO memory are dimensioned to store at least $p*L_p$ data, where p is the tolerable maximum number of consecutive errors affecting in a burst the functional logic block and $L_p$ is an estimate of the latency of the functional logic block.

According to one particular aspect of the invention, the size of the buffer memory depends on the latency of the functional logic block.

According to one particular aspect of the invention, the transient-error-detecting logic unit comprises a redundant functional logic block and a unit for comparing the results produced by the functional logic block and the redundant functional logic block, respectively.

According to one particular aspect of the invention, the functional logic block is of constant latency.

According to one particular aspect of the invention, the functional logic block is provided with at least one second input and at least one second output in order, when they are connected together, to produce at least one external feedback loop, and said logic array comprises at least one second buffer memory that is supplied with samples by said at least one second output of the functional logic block, the logic control unit being configured, when an error is detected by the transient-error-detecting logic unit, to switch said at least one second input of the functional logic block from said at least one second output of the functional logic block to the output of said at least one second buffer memory.

According to one particular aspect of the invention, said logic array comprises at least one second multiplexer for connecting said at least one second input of the functional logic block to said at least one second output of the functional logic block or to said at least one second buffer memory.

According to one particular aspect of the invention, the logic control unit is configured to control the second multiplexer of each array depending on the result of the error-detecting logic unit.

According to one particular variant of the invention, the digital integrated circuit according to the invention comprises a plurality of said logic arrays and wherein an input FIFO memory of a first logic array is an output FIFO memory for a second logic array located upstream.

BRIEF DESCRIPTION OF THE DRAWINGS

Other features and advantages of the present invention will become more clearly apparent on reading the following description with reference to the appended drawings, which show.

DETAILED DESCRIPTION

The invention consists in implementing, in the digital integrated circuit, for each function of the circuit to be protected, a mechanism for protecting from transient errors.

Figure 1:
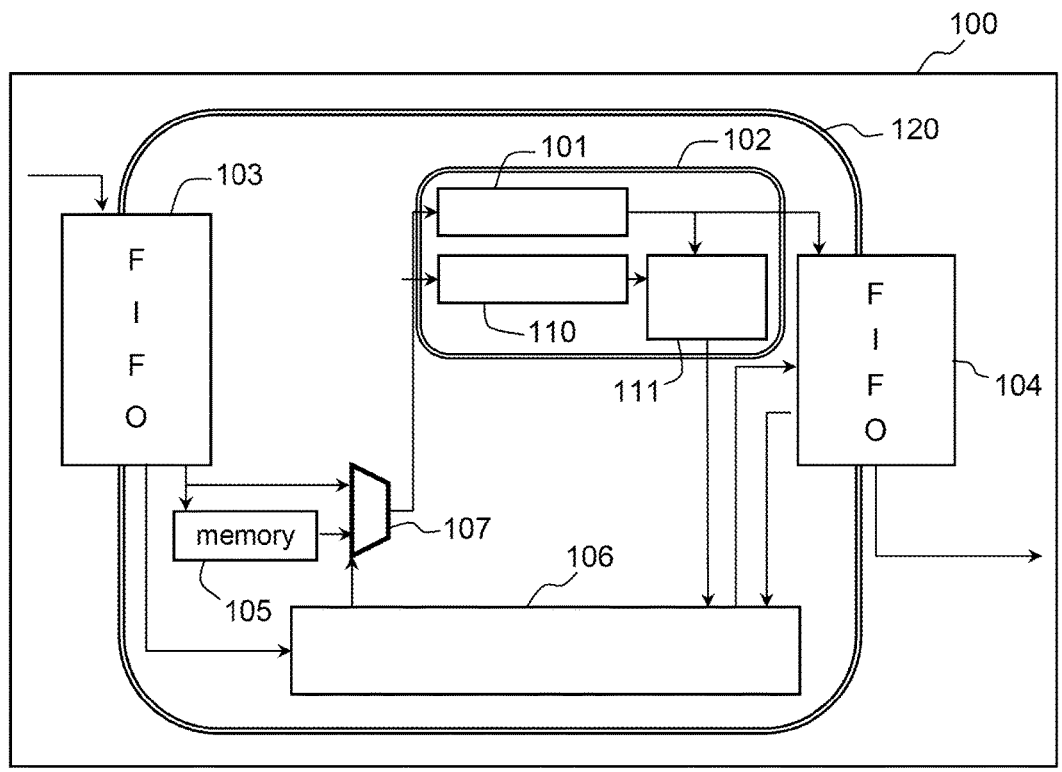
FIG. 1, a diagram of a digital integrated circuit according to the invention, suitable for constant latency functions.

FIG. 1 shows a portion 100 of a digital integrated circuit comprising a functional logic block 101 that executes a function that is sensitive to transient errors, and that the invention aims to protect. The functional logic block 101 may correspond to an elementary logic function or to a set of logic functions that are interconnected in order to produce a particular processing operation. From this point of view, the functional logic block 101 is modular and corresponds to a group of one or more logic gates of the circuit to be protected. The mechanism for protecting from errors that is provided by the invention is constructed around the functional logic block 101 to be protected. Thus, in a given integrated circuit, a plurality of functional logic blocks may be protected by associating a protecting mechanism with each of the blocks. One constraint on the functional logic block 101 is that it must have a constant latency: in other words, the number of input samples required to generate a result must be constant whatever the input data. The functional logic block 101 is integrated into the transient-error-detecting logic unit 102.

The protecting mechanism according to the invention mainly comprises a transient-error-detecting logic unit 102, an input FIFO memory 103 for receiving data in the form of samples and supplying the input of the transient-error-detecting logic unit 102 including the functional logic block 101, an output FIFO memory 104 for receiving the samples output by the functional logic block 101, a buffer memory 105 and a logic control unit 106. The input FIFO memory 103 and the output FIFO memory 104 are gradually filled according to a principle known as first in first out. The input FIFO memory 103 is supplied by the functional processing operations located upstream. The output FIFO memory 104 delivers data to the functional processing operations located downstream. The buffer memory 105 is gradually filled with the L last samples read from the input FIFO memory 103, L being the size of the buffer memory 105.

The logic control unit 106 is able to control the various elements of the protecting mechanism. In particular, it controls the activity of the error-detecting logic unit 102, the activity of the functional logic block 101, read access to the input FIFO memory 103 and write access to the output FIFO memory 104.

The principle of protection of the functional logic block 101 is the following. The error-detecting logic unit 102 makes it possible to detect, each time a result is produced by the functional logic block 101, whether a transient error has disrupted the execution of the processing operation. A plurality of known solutions may be employed to implement an error-detecting mechanism.

A first solution consists in adding a second instance 110 of the functional logic block 101, which is executed in parallel with the same input data and is therefore supposed to produce the same result. A comparator 111 allows a difference between the results produced by the two instances 101, 110 of the functional logic block to be detected, this difference indicating a transient error in one of the two instances.

This first solution may be made less costly in number of operations to be carried out and in logic gates by implementing a modulo projection of the function to be made redundant. In other words, the second instance 110 of the functional logic block reproduces the processing operations of the first instance 101 but by projecting the data, the operands and the intermediate results, at every point of the block, to a value modulo N, where N is a strictly positive integer. The comparator 111 then makes a comparison between the result of the first instance 101 of the functional logic block, i.e. the result projected to its value modulo N and the result produced by the second instance 110. This variant of implementation is however compatible only with linear functions, and does not allow all errors to be detected.

Other error-detecting solutions are possible, such as the use of error-detecting encoding applied to the data before they are processed by the functional logic block 101. The error-detecting logic unit 102 then comprises a module for detecting errors based on decoding the error-detecting code.

Without departing from the context of the invention, any mechanism allowing an error to be detected in the result produced by the functional logic block 101, by spatial redundancy, by addition of redundancy to the data to be processed or by other means, is envisageable.

The error-detecting logic unit 102 is connected to the logic control unit 106 in order to inform it of detection of an error. When this event occurs, the logic control unit 106 provisionally forbids writing to the output FIFO memory 104, provisionally forbids reading from the input FIFO memory 103, resets the error-detecting logic unit 102 and the functional logic block 101, then allows read access to the buffer memory 105 in order to allow a sequence of samples, obtained prior to the error, to be provided as input to all the instances 101, 110 of the functional logic block in order to restore the state of this block. The input of the functional logic block 101 may be switched from the input FIFO memory 103 to the buffer memory 105 by means of a multiplexer 107 or any other equivalent means. The functional logic block 101 then executes its processing operation on the data read from the buffer memory, which are identical to the data already processed beforehand and which led to an erroneous result because of a transient error. On command by the logic control unit 106, the buffer memory 105 ceases to record the samples read from the input FIFO memory 103 provided that the internal state of the functional block 101 has not been completely restored.

In nominal operation, i.e. when no error is detected in the output of the functional logic block 101, the samples are read directly from the input FIFO memory 103. In parallel, the L last samples read from the input FIFO memory 103 are, at any given time, stored in the buffer memory 105 that is connected to the input FIFO memory 103. The size L of the buffer memory 105 is directly related to the latency of the functional logic block 101. It is at least equal to this latency, expressed in number of samples. Specifically, the role of the buffer memory 105 is to preserve, at any given time, the L last samples read from the input FIFO memory 103 in order to allow the internal state of the functional logic block 101 to be restored and the function executed by the functional logic block 101 on the L last samples to be replayed if a transient error occurs. The term "replayed" is understood to mean the processing carried out by a functional logic block is newly carried out on the same samples as in the preceding sequence.

The invention relates to the general case of digital integrated circuits in which it is difficult to save and restore the internal state, in contrast to digital circuits such as microprocessors, microcontrollers, multi-core processors, graphics processing units or GPUs and digital signal processors or DSPs in which the internal state is entirely defined by a limited set of registers that are read and write accessible via a bus.

Instead of saving the internal state, the prior sequence of input samples is saved. Instead of restoring a previously archived internal state, the internal state is restored indirectly by replaying the processing of a prior sequence, until the latency of the function is reached.

As explained at the start of this document, a transient error is reversible and it is generally enough to reset the functional logic block 101 to remove the effect of this error. If a new error is nonetheless detected by the error-detecting logic unit 102, the replay mechanism is iterated as many times as necessary until the result produced by the functional logic block 101 is validated. Thus, the buffer memory makes it possible to travel back in time by saving the data required to restore the internal state of the functional logic block 101 and to replay or re-execute the function impacted by the error after its reset. The size of the buffer memory is therefore at least equal to the latency of the functional logic block 101.

One objective of the invention is to protect the functional logic block 101 from transient errors while guaranteeing continuity of service from the integrated circuit. In other words, the replay mechanism activated following detection of an error must not disrupt the overall operation of the circuit and in particular must not modify its speed of execution such as observable from the input and output interfaces.

To this end, the design of the circuit consists of two distinct clock domains. The protected portion 120 of the integrated circuit, comprising the error-detecting logic unit 102, the functional logic block 101, the logic control unit 106, the buffer memory 105 and the multiplexer 107, is run at a faster rhythm than the nominal average operating rhythm of the input and output interfaces of the functional logic block 101. The input FIFO memory 103 and the output FIFO memory 104 are dual-clock FIFO memories that are interfaced between the two clock domains. In other words, each FIFO memory has an input port associated with a first clock and an output port associated with a second clock. This makes it possible to decouple the rhythm of the data between the external clock domain and the accelerated internal clock domain.

The acceleration of the operating rhythm of the protecting system allows the delay induced by the additional processing operations required by the error correction to be compensated for with a view to preserving operation without error in the nominal average rhythm such as observable at the interfaces of the logic block 120 protected by the invention. Furthermore, the accelerated rhythm of the protecting system is made irregular, in order to allow a margin of time to be obtained in which to reset the error-detecting logic unit 102 including the functional logic block 101, to replay the processing operation implemented by this block, and to make up for the delay in the processing of the data in case of error detection.

The sequencing of the protecting system is ensured by the logic control unit 106, which controls:

the source of the input data of the error-detecting logic unit 102 including the functional logic block 101, namely the input FIFO memory 103 or the buffer memory 105;

the reset of the error-detecting logic unit 102 including the functional logic block 101;

the activity of the error-detecting logic unit 102 including the functional logic block 101;

the transmission of the output data of the functional logic block 101 to the output FIFO memory 104.

The sequencing is irregular and is dependent on the availability of data in the input FIFO memory 103, on the space available in the output FIFO memory 104, on the detection of an error by the error-detecting logic unit 102 and on the latency of the functional logic block 101.

For example, when the output FIFO memory 104 is full, the logic control unit 106 blocks the activity of the error-detecting logic unit 102 including the functional logic block 101, thereby preventing further write access to the output FIFO memory 104 until space is freed. Likewise, if the input FIFO memory 103 is empty, the logic control unit 106 blocks the activity of the error-detecting logic unit 102 including the functional logic block 101, thereby preventing further read access to the input FIFO memory 103 provided that new samples are not available in this memory. Thus, the output FIFO memory 104 is able to communicate to the logic control unit 106 its fill state. The same goes for the input FIFO memory 103.

Respect of the continuity of service and of the average frequency of execution of the processing operations such as observable from the exterior of the protecting system 120 directly depends on the dimensions of the input FIFO memory 103 and of the output FIFO memory 104. These dimensions in particular thus depend on the latency of the functional logic block 101, on the maximum number of errors to be tolerated in a burst, and on the acceleration of the processing frequency within the protecting system 120.

The irregular acceleration of the rhythm of execution within the protecting system 120 may be achieved, on the one hand, by means of a regular clock of accelerated frequency and, on the other hand, using an activation signal (clock-enable signal) which sets whether the clock is taken into account by the flip-flops of the sequential logic, this activation signal being controlled by the logic control unit 106. This allows architectures that are synchronized to a continuous clock to be used and the sequencing rhythm to be adjusted dynamically, where needs be, via the activation signal. The irregular acceleration may optionally comprise inactive cycles. To this end, the activation signal has the ability to freeze the sequential logic in order to force inactive cycles.

Figure 2A:
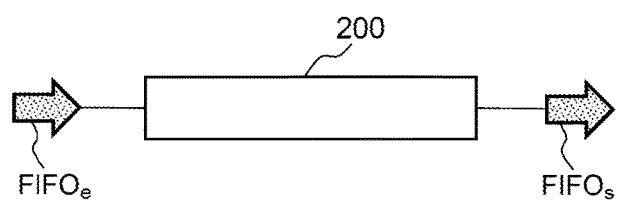
FIGS. 2a and 2b, two examples of application of the invention to one or more functional processing blocks.
Figure 2B:
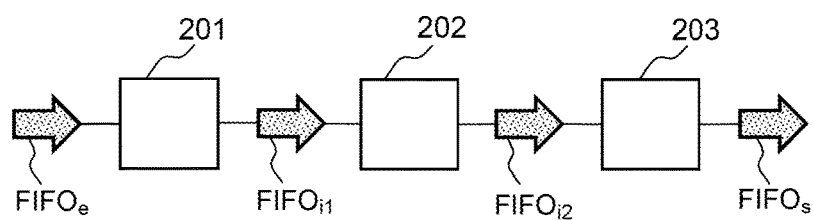

The invention may be applied globally to a whole processing chain 200 or to a plurality of blocks 201, 202, 203 of a processing chain, as is illustrated in FIGS. 2a and 2b. Each block of the processing chain is produced so as to have a set and constant latency that depends on the complexity of the processing operations in each block.

In the case of FIG. 2a, the circuit protected by the invention includes a single input FIFO memory $FIFO_e$ and a single output FIFO memory $FIFO_s$ that serve to interface the clock domain that is internal to the processing chain 200 protected by the invention and the external clock domain corresponding to the inputs and outputs of the processing chain 200.

In the case of FIG. 2b, each block protected by the invention is interfaced with an upstream block via an input FIFO memory and with a downstream block via an output FIFO memory. Thus, in the example of FIG. 2b comprising three blocks 201, 202, 203, the circuit includes an input FIFO memory $FIFO_e$ that is connected to the input of the first block 201, an output FIFO memory $FIFO_s$ that is connected to the output of the last block 203 and two intermediate FIFO memories $FIFO_{i1}$, $FIFO_{i2}$ that serve both as input FIFO memory and output FIFO memory. The memory $FIFO_{i1}$ serves as input memory for the block 202 and as output memory for the block 201. The memory $FIFO_{i2}$ serves as input memory for the block 203 and as output memory for the block 202.

As explained above, the clock domain that is internal to a processing block 200, 201, 202, 203 protected by the invention is accelerated with respect to the nominal need. To ensure continuity of service throughout the circuit, the fill level of the input and output FIFO memories is controlled by the logic control unit of each block.

The logic control of the fill level of an input or output FIFO interface memory $FIFO_e$ or $FIFO_s$ will now be described.

Ideally, in order to be able to replay a functional processing operation following the detection of an error in this processing operation, the output FIFO memory acting as external interface must be almost full, in order to optimize the capacity to deliver valid output data during the replay, throughout which writing to the output FIFO memory is suspended. Likewise the input FIFO memory acting as internal interface must be almost empty, in order to optimize the capacity to store input data during a replay, throughout which reading from the input FIFO memory is suspended. It is therefore possible to optimize the dimensions of the two FIFO memories by adjusting the nominal operation to these target fill levels. In other words, outside of error-recovery phases, the fill level of an input FIFO memory is controlled in order to be almost empty and the fill level of an output FIFO memory is controlled in order to be almost full. The expression "almost empty" must be understood to mean that the almost empty memory contains a minimum number of data or samples, typically about 10 samples. Likewise, the expression "almost full" must be understood to mean that the almost full memory is almost entirely full, with a free memory space corresponding to an order of about 10 data or samples. These configurations of course do not apply to the intermediate FIFO memories $FIFO_{i1}$, $FIFO_{i2}$, which have the dual function of input and output memory.

If a FIFO memory becomes full, the upstream processing is suspended. If a FIFO memory becomes empty, the downstream processing is suspended.

In the case of the intermediate memories $FIFO_{i1}$, $FIFO_{i2}$, which interface two processing blocks protected by the invention, it is necessary to reconcile the filling objectives with respect both to the input and output needs. In this case, the optimal target fill level is therefore a median level of 50%. At the output of a processing chain, a break in the sequence of results (which also corresponds to erroneous results) may in particular be observed if:
the input FIFO memory of a block is full whereas new write operations have been requested;
the input FIFO memory of a block is empty whereas new read operations have been requested;
the output FIFO memory of a block is empty whereas new read operations have been requested; and
the output FIFO memory of a block is full whereas new write operations have been requested.

It is therefore necessary to dynamically manage the fill level of the various interface FIFO memories (interfaces between blocks and with the exterior of the blocks) in order to prevent these breaks in output sequence. This dynamic management is carried out by the logic control unit 106 of each block protected by the invention. In practice, the activity of each block is dependent on the fill level of its input FIFO memory and of its output FIFO memory. This activity gradually has an influence on the activity of the other blocks since the FIFO memories serve as interfaces. At either end of the processing chain, input data arrive at a given rhythm R and output data must be generated at the same rhythm R in the case of single-rate processing.

The rhythm R is an average operating rhythm of a single-rate processing chain. It corresponds to the throughput of input or output samples. This average rhythm also corresponds to an average clock frequency F.

The logic of a functional block 120 that is protected by the invention is run at a rhythm Ra via a clock with a frequency Fa that is accelerated relative to the average clock frequency F external to the block 120: $Fa=\gamma*F$ and $Ra=\gamma*R$ (with $\gamma>1$). The average clock frequency F external to the block 120 corresponds to the average frequency at which the input FIFO memory of the block 120 is written to. The degree $\gamma$ of acceleration of the frequency may be chosen to be very close to 1, typically $\gamma=1.05$ or $\gamma=1.1$ in order to limit the difference between the functional average rhythm R and the accelerated average rhythm Ra of sequencing of the logic of the functional block 120. This allows the impact of the protecting device on processing speed to be limited. The functional block 120 operates with a clock at the frequency Fa and conditionally upon an activation signal controlling the activity of the block in an irregular operating mode as explained above.

For a given processing block 120, excessive filling of the input FIFO memory is avoided by increasing the average activity of the block, this inducing an increase in the average rhythm with which this input FIFO memory is read. The average activity is modulated (decreased or increased) dynamically by controlling the activation signal specific to the processing block. The activation signal is controlled by the logic control unit 106. This activation signal is typically generated by a sequencer, on the clock at the operating frequency Fa of the protected block 120. If $\gamma_i$ denotes the degree of activity (variable with $0 \leq \gamma_i \leq 1$) of the activation signal, then the processing rhythm of the block 120 is equal to $\gamma_i*Ra=\gamma_i*\gamma*R$. The degree of activity $\gamma_i$ varies dynamically and independently for each protected processing block.

Whereas the acceleration $\gamma$ and the average rhythm R are set, the degree of activity $\gamma_i$ of the activation signal is adjustable dynamically by a control logic that is sequenced to the accelerated clock (at the frequency Fa). The generation of the activation signal therefore allows the processing rhythm of the block 120 to be adjusted dynamically. When the input FIFO memory 103 of the block 120 has too high a fill level, the processing rhythm of the block 120 is increased in order to read the input FIFO memory 103 more rapidly than it fills. Once its fill level has dropped below a given threshold, the processing rhythm of the block 120 is slowed, again via control of the activation signal. The fill level of the FIFO memories 103, 104 is also controlled by the logic control unit 106.

Occasionally increasing the processing rhythm of the block 120 leads to an increase in the fill level of its output FIFO memory 104 (if a block located downstream of the block 120 is not itself accelerated) and to a decrease in the fill level of its input FIFO memory 103 (if a block located upstream of the block 120 is not itself accelerated). This allows an excess of data in the input FIFO memory 103 to be converted into an excess of data in the output FIFO memory 104.

Occasionally decreasing the processing rhythm of the block 120 leads to a decrease in the fill level of its output FIFO memory 104 (if a block located downstream of the block 120 is not itself slowed) and to an increase in the level of its input FIFO memory 103 (if a block located upstream of the block 120 is not itself slowed). This allows an excess of data in the output FIFO memory 104 to be indirectly converted into an excess of data in the input FIFO memory 103. Thus the logic control unit 106 dynamically controls the activity of each block of the processing chain in order to adjust the fill levels of the FIFO memories, from upstream to downstream, or from downstream to upstream.

In order to be operational, the protecting mechanism provided by the invention must be initialized, in particular in order to fill the intermediate FIFO memories $FIFO_{i1}$, $FIFO_{i2}$ and the output FIFO memory $FIFO_s$ with the target fill levels i.e. half full and almost full, respectively, as described above. This initialization operation is, for example, ensured via a start-up sequence such as illustrated in FIG. 2c.

Figure 2C:
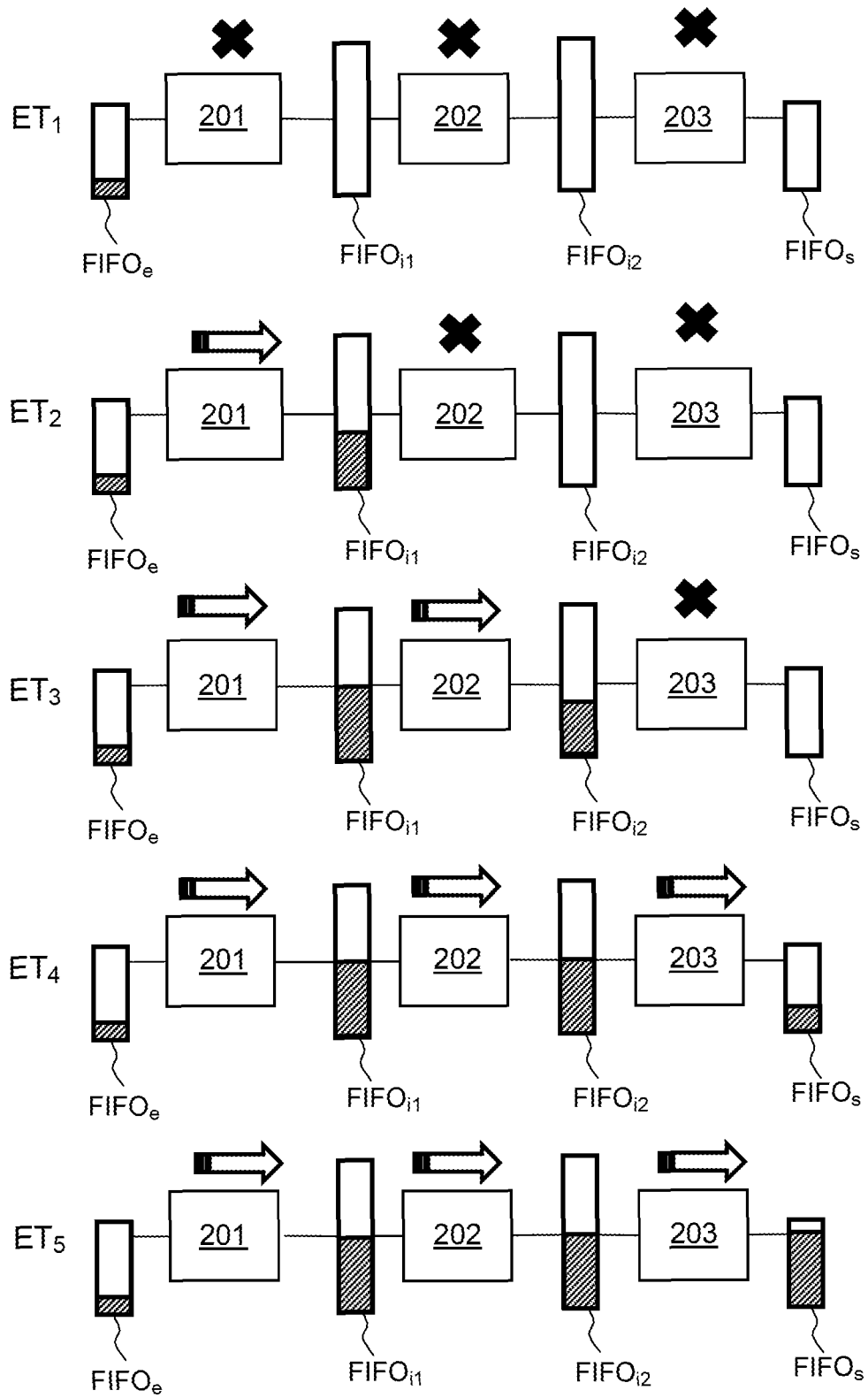
FIG. 2c, an illustration, for the example of FIG. 2b, of an initialization sequence of the circuit protected by the invention.

FIG. 2c schematically shows, for the example device illustrated in FIG. 2b, the gradual filling of FIFO memories in five consecutive steps ET1,ET2,ET3,ET4,ET5. At the end of the first step ET1, the input FIFO memory $FIFO_e$ has filled to its optimal level (almost empty). At the end of the second step ET2, the first intermediate FIFO memory $FIFO_{i1}$ has filled to its optimal level (50%). At the end of the third step ET3, the second intermediate FIFO memory $FIFO_{i2}$ has filled to its optimal level (50%). During the fourth step ET4, the output FIFO memory $FIFO_s$ is filled. At the end of the fourth step ET4, the output FIFO memory $FIFO_s$ has filled to its optimal level (almost full). ET5 represents the final initialization state in which all the FIFO memories have filled to their target levels.

At the end of the initialization procedure comprising the successive filling steps illustrated in FIG. 2c, all the FIFO memories of the circuit (protected by the invention) have been filled to their optimal level, this then allowing the protecting mechanism according to the invention to be implemented while preserving continuity of service.

More precisely, the protecting mechanism according to the invention may be activated for each of the functional logic blocks 201, 202, 203, once their respective output FIFO memories have been filled to their optimum fill level.

In other words, for the functional logic block 201 supplied by an input FIFO memory $FIFO_e$, the initialization sequence terminates and the protecting mechanism may be activated when its output FIFO memory $FIFO_{i1}$ has reached its optimal fill level. Activity after start-up of the block 201 is conditional upon the input FIFO memory $FIFO_e$ being filled to its optimal fill level.

For the functional logic block 202 supplied by an intermediate FIFO memory $FIFO_{i1}$, the initialization sequence terminates and the protecting mechanism may be activated when its output FIFO memory $FIFO_{i2}$ has reached its optimal fill level. Activity after start-up of the block 202 is conditional upon its input FIFO memory $FIFO_{i1}$ being filled to its optimal fill level.

In the case of a single block protected according to the invention (example of FIG. 2a), its activity after start-up is conditional upon the input FIFO memory $FIFO_e$ being filled to its optimal fill level.

During this initialization or start-up phase, for each protected functional logic block 201, 202, 203, the logic control unit 106 controls the activity of the block, via the activation signal of the block, depending on the fill levels of the upstream FIFO memory and the downstream FIFO memory.

In the steady-state regime, after the initialization sequence illustrated in FIG. 2c and outside of error-correcting sequences, each functional logic block protected according to the invention manages the fill level of its downstream FIFO memory (connected to the output of the block) in order to maintain the target fill level. More precisely, the logic control unit 106 of each block monitors and controls this fill level using the activation signal allowing the rhythm of activity within the block to be modified.

For the case of a block 201, 202 that is connected to an intermediate FIFO memory $FIFO_{i1}$, $FIFO_{i2}$ downstream, the target fill level is 50%. When the fill level of this memory exceeds a high threshold $S_h$=50%+Δ, where Δ is a parameter of the invention, the logic control unit 106 suspends the activity of the block via the activation signal. Then, when the fill level of this memory drops below a median threshold $S_m$=50%, the logic control unit 106 re-initiates the activity of the block at the nominal rhythm R.

When the fill level of the memory drops below a low threshold $S_b$=50%-Δ, the logic control unit 106 accelerates the activity of the block to the rhythm Ra with the activation signal. Then, when the fill level once again exceeds the median threshold $S_m$=50%, the logic control unit 106 slows the activity of the block in order to return to the nominal rhythm R.

In summary, to dynamically manage the fill level of an intermediate FIFO memory located downstream of a block protected by the invention, the logic control unit 106 of the block controls the activity of the block via the activation signal, depending on the fill level of the downstream FIFO memory relative to three thresholds: $S_b$=50%-Δ, $S_m$=50% and $S_h$=50%+Δ. Δ is a parameter of the invention that is typically of the order of the percentage of occupancy of the memory corresponding to about ten samples.

In the case of a block 203 that is connected to an output FIFO memory $FIFO_s$ downstream, the principle described above is similar but the three thresholds are defined in the following way: $S_b$=100%-2Δ, $S_m$=100%-Δ and $S_h$=100%-δ. δ is another parameter of the invention that typically is of the order of the percentage of occupancy of the memory corresponding to one or two samples.

Thus, control of the fill level of the output $FIFO_s$ memory allows this fill level to be adjusted to an almost full level, thereby avoiding saturation of the FIFO memory.

To dynamically manage the fill level of the output $FIFO_s$ memory, the logic control unit 106 controls the activity of the last protected block 203, via the activation signal of the block, depending on the fill level of the downstream memory $FIFO_s$ relative to three thresholds: Sb=100%-2Δ, Sm=100%-Δ and $S_h$=100%-δ.

Various cases of dynamic adjustment of the fill levels of the FIFO memories will now be illustrated for the example of FIG. 2b.

A first example application relates to a scenario in which an error is detected in the functional block 202. According to the logic implemented by the invention, such as illustrated in FIG. 1, the processing of the functional block 202 is replayed, this leading to a delay in the processing of the input data by the block 202. Therefore, the output FIFO memory $FIFO_{i2}$ of the block 202 sees a deficit of data and has a lower fill level than that expected. Conversely, the input FIFO memory $FIFO_{i1}$ of the block 202 sees an excess of data and has a fill level higher than that expected. To dynamically adjust these fill levels, the logic control unit 106 of the block 202 activates an activation signal in order to accelerate the processing rhythm of the block 202 in order to regularize the delay in processing input data. This acceleration has the effect of decreasing the fill level of the input FIFO memory $FIFO_{i1}$ and of increasing the fill level of the output FIFO memory $FIFO_{i2}$. This illustration of application of the invention to this first example shows that the mechanism of correction by replay with dynamic acceleration proposed by the invention allows the processing chain to be restored to the right operating state, and in particular the FIFO memories to be restored to their expected fill levels.

Another example of application relates to a case of a deficit of data in the output FIFO memory $FIFO_s$ of the entire processing chain. When the logic control unit of the block 203 detects that the fill level of the memory $FIFO_s$ is too low, it triggers an acceleration in the processing frequency of the block 203. This acceleration results in a decrease in the fill level of the input FIFO memory $FIFO_{i2}$, which also plays the role of output memory for the block 202 that is located upstream. Thus, via a cascade effect, the block 202 then the block 201 accelerates its processing frequency in order to adjust the fill level of the output memories. These chain accelerations result in fine in a deficit of data in the input FIFO memory $FIFO_e$ of the processing chain that is equivalent to the initial deficit in the output FIFO memory $FIFO_s$.

By dynamically controlling the processing frequency of each block 201, 202, 203, it is possible in the same way to convert an excess of data in the output FIFO memory $FIFO_s$ into an excess of data in the input FIFO memory $FIFO_e$ by slowing the operation of each block.

Similarly, an excess of data in the input FIFO memory $FIFO_e$ may be converted into an excess of data in the output FIFO memory $FIFO_s$ by accelerating the operation of each block.

Similarly, a deficit of data in the input FIFO memory $FIFO_e$ may be converted into a deficit of data in the output FIFO memory $FIFO_s$ by slowing the operation of each block.

In practice, the input and output FIFO memories of the processing chain are not supposed to have a deficit or excess of data outside of the transient regime corresponding to the start-up of the chain.

In general, the downstream function interfaces with a FIFO memory and whether or not said memory may be read from is dependent on the availability of data. Likewise, the chain starts up only when the fill level of the input FIFO memory is satisfactory. Thus, during nominal operation of the chain, all the FIFO memories have a normal fill level. Thus, the only cases of FIFO memories having a deficit or excess of data correspond to phases of correction by replay following detection of an error.

Figure 3A:
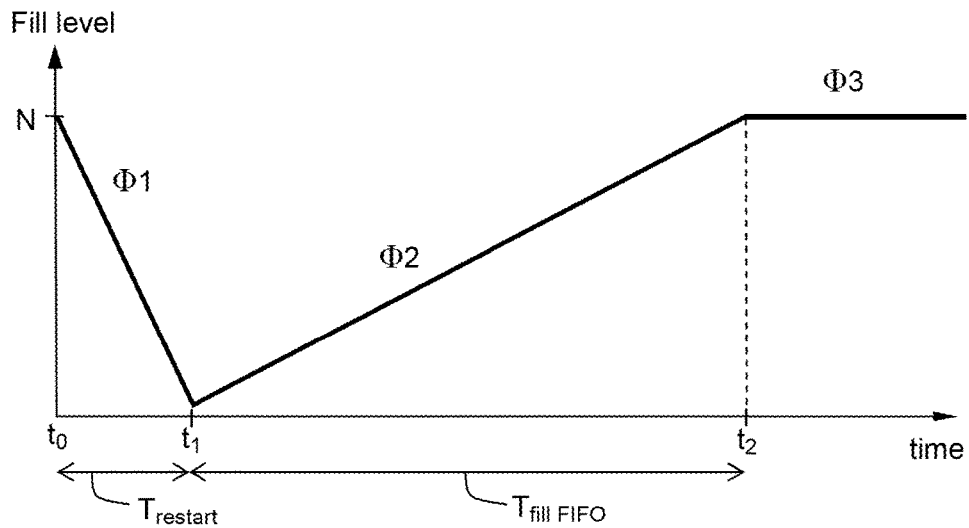
FIGS. 3a and 3b, two graphs illustrating the fill level of an output FIFO memory and of an input FIFO memory during execution of the invention, respectively.
Figure 3B:
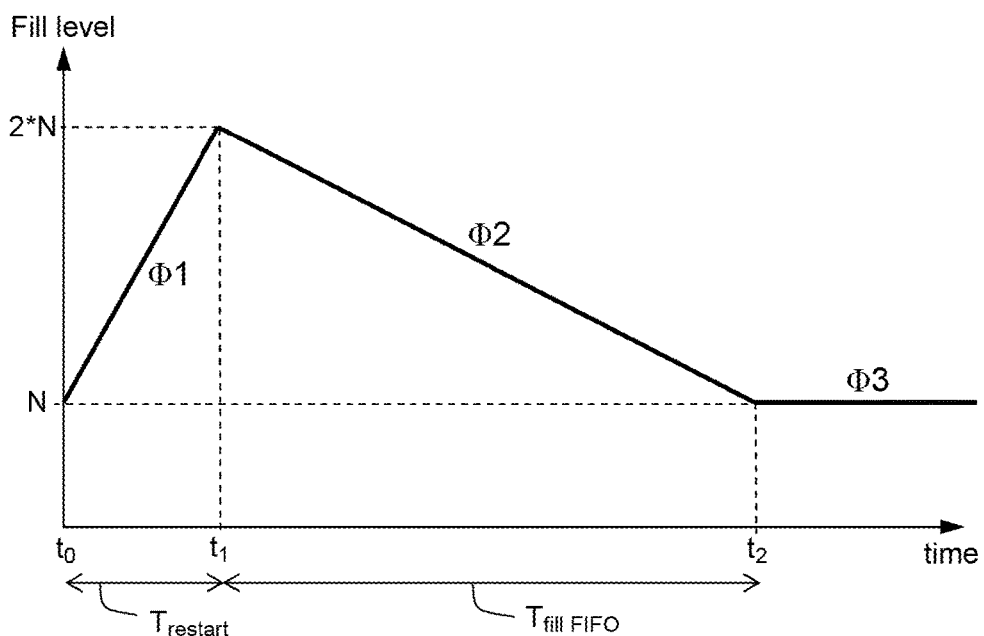

FIGS. 3a and 3b illustrate, in two graphs respectively, the variation in the fill level of an output FIFO memory 104 (FIG. 3a) and of an input FIFO memory 103 (FIG. 3b) in the period of time following detection of an error.

At the time $t_0$, a transient error is detected in the output of the functional logic block 101. Following detection of this error, in a first phase $\phi_1$, processing is interrupted in this block, read access to the input FIFO memory 103 is suspended, and write access to the output FIFO memory 104 is suspended. The input FIFO memory 103 then continues to fill whereas the output FIFO memory 104 continues to empty at a rhythm R, as indicated in FIGS. 3a and 3b. The error-detecting logic unit 102 including the functional logic block 101 is reset, and the state prior to the detected error is restored indirectly on the basis of accelerated processing at the rhythm Ra of the L data stored in the buffer memory 105.

The first phase $\phi_1$ terminates at a time $t_1$ when the processing of the functional block 101 is restarted beginning with the result that was detected to be in error, and with an accelerated rhythm $R_a > R$. In a second phase $\phi_2$, the functional block 101 is then once again permitted to read data from the input FIFO memory 103. The results of the processing executed by the functional block 101 are written at the rhythm Ra to the output FIFO memory 104 more rapidly than they are read by a block located downstream, and therefore the output FIFO memory 104 fills again as illustrated in FIG. 3a.

The second phase $\phi_2$ terminates at a time $t_2$ when the fill level of the output FIFO memory 104 has reached a preset threshold that is considered optimal. In a third phase $\phi_3$, the functional logic block 101 then returns to a nominal processing rhythm R. The ability to protect is then restored.

If N denotes the number of data present in the output FIFO memory 104 at the time $t_0$ and that corresponds to the optimal fill level, the time required to empty the output FIFO memory 104 of its N data during the first phase $\phi_1$ is equal to $T_{empty} = N/F$.

The time required to reset the error-detecting logic unit 102 including the logic functional block 101, to restore its prior state by processing L samples obtained prior to the error, to restart the thread of the processing on the result that was in error and to restart writing results to the output FIFO memory 104 in the second phase $\phi_2$ is equal to $T_{restart} = (L+\epsilon)/F_a$, where L is the latency of the block 101 expressed in cycles, $\epsilon$ is a margin equal to a few cycles, typically less than 10 cycles, in order to take into account potential asynchronicities and the synchronization, $Fa = \gamma*F$ and $\gamma > 1$, F being expressed in hertz.

The condition that guarantees a restart that is transparent to the blocks downstream of the block 120, in other words that guarantees that the detection of errors is imperceptible at the output of the processing chain is: $T_{restart} < T_{empty}$. If this condition is met, the output FIFO memory 104 is never completely emptied. This condition therefore amounts to the following condition:

$$N > (L+\epsilon)/\gamma.$$

The above reasoning with regard to the output FIFO memory 104 is valid for all the memories $FIFO_i$ that serve both as input memories and output memories. For the block in question 101, the input FIFO memory 103 is normally used with N data available. During the correction by replay in the block in question 101, the input FIFO memory 103 is filled with N new data, without being read during the phase $\phi_1$. Thus, each FIFO memory must therefore be able to store $2*(N+\epsilon)$ data. In practice, a FIFO memory size larger than $2*(L+\epsilon)$, is chosen for each FIFO memory.

In the case of an input FIFO memory 103 that does not serve as an output FIFO memory for a block protected according to the invention, the need in terms of capacity of the FIFO memory may be decreased to $(L+\epsilon)$ data, because the optimal fill level for an input FIFO memory is almost empty.

The restoration time $T_{restore}$ corresponds to the length of time taken to process an error and to restore the ability to correct, i.e. the fill levels of the FIFO memories. It is equal to $T_{restore} = T_{restart} + T_{fill\ FIFO}$.

$T_{fill\ FIFO}$ is the time required to fill the input FIFO memory (or the output FIFO memory) to its optimal fill level.

During the phase $\phi_2$, the output FIFO memory 104 is read at a rhythm R by a downstream block, and it is filled at an accelerated rhythm Ra by the current block 101. On the whole, its fill level increases at the rhythm $R(\gamma-1)$. Therefore, it may be deduced therefrom that $T_{fill\ FIFO} = N/(F*(\gamma-1))$ and therefore that $T_{restore} = (L+\epsilon)/Fa + N/(F*(\gamma-1)) = (L+\epsilon)/(\gamma*F) + N/(F*(\gamma-1))$.

The reasoning developed above with regard to the dimensions of the FIFO memories and the time taken to restore the ability to correct corresponds to processing of an error in one block of the processing chain. This reasoning may be extended to the case of a succession of errors within the protected function 101 (either at the overall chain level, or at the processing block level) during the phase $\phi_1$ in course of replay. The need in terms of dimensions of the FIFO memories is different in this case.

During the phase $\phi_1$ of a replay, the input data for the block 101, which data were obtained prior to the manifestation of the error, are still available into the buffer memory 105 located downstream of the input FIFO memory 103 and their integrity is preserved. During this phase $\phi_1$, the input FIFO memory 103 is no longer read, and the data archived in the buffer memory 105 are alone used to restore the prior state of the function of the processing block 101. The occurrence of a second error during this phase leads this phase $\phi_1$ to be re-initiated (re-initialization/restoration of the prior state). Thus, the duration of this phase $\phi_1$ will be at most doubled. In the general case, the duration of the phase $\phi_1$ is shorter than or equal to $p*T_{restart}$ in the case of p errors consecutively spaced by less than $T_{restart}$. Equality is reached when the new error occurs at the end of the phase $\phi_1$. In this case, each and every new restart is carried out on the basis of the same input data, which data are archived in the buffer memory 105.

However, new input data continue to arrive at the rhythm R and fill the input FIFO memory 103, which is no longer read by the block 101 as the read-out has been suspended and remains so for a length of time at most equal to $p*T_{restart}$. The input FIFO memory 103 must therefore contain $p*(L+\varepsilon)$ free places in the steady-state regime. In addition, the downstream stage is waiting for new output data. The output FIFO memory 104 must therefore contain $p*(L+\varepsilon)$ data in the steady-state regime. Therefore, to tolerate p consecutive errors each separated from the preceding error by a time interval of duration shorter than $T_{restart}$ (new errors in phase $\phi_1$), the input and output memories $FIFO_e$ and $FIFO_s$ must be dimensioned to store $p*(L+\varepsilon)$ data. The intermediate memories $FIFO_i$, which play the role both of input memory and output memory between two protected blocks, must be dimensioned to store $2p*(L+\varepsilon)$ data.

If another error occurs during the replay phase $\phi_2$ of the block 101, the fill levels of the input and output FIFO memories will not yet have been completely restored. A new error at the start of phase $\phi_2$ causes the entire correction sequence (phase $\phi_1$ then phase $\phi_2$) to be reinitiated, but with margins in the fill levels of the input and output FIFO memories decreased by N data.

Thus, to tolerate p consecutive errors each separated from the preceding error by a time interval of duration longer than $T_{restart}$ and shorter than $T_{restore}$ (new errors in phase $\phi_2$), the FIFO memories must also be dimensioned to store $2p*(L+\varepsilon)$ data.

Incorporating the margin $\varepsilon$ into an estimate $L_p$ of the latency of the function 101, the minimum size of the FIFO memories is equal to $p \cdot L_p$ or $2p \cdot L_p$ depending on whether the FIFO memory only acts as an input memory or output memory or whether the FIFO memory provides both these two functions.

Figure 4A:
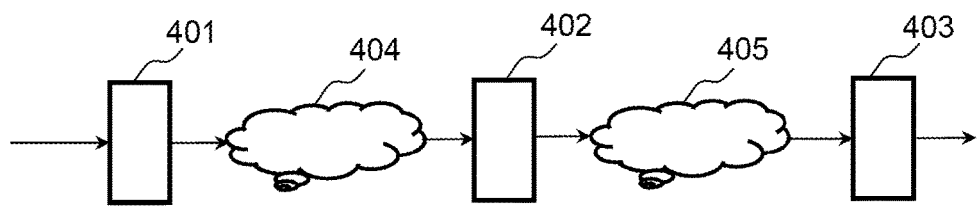
FIG. 4a, a schematic of a circuit comprising a plurality of functional logic blocks of constant latency.

The above description of the invention related to functional logic blocks 101 having a constant latency. This corresponds to circuits organized into a cascade of stages, the intermediate and output signals of which are always propagated to a downstream stage, without being feedback to upstream stages. These circuits have a constant latency: the results output depend only on the latest N data input. A typical example of constant-latency circuits is the family of the FIR filters. FIG. 4a schematically shows such a circuit, in which circuit the rectangles 401, 402, 403 represent registers and the clouds 404, 405 represent combinational logic.

Figure 4B:
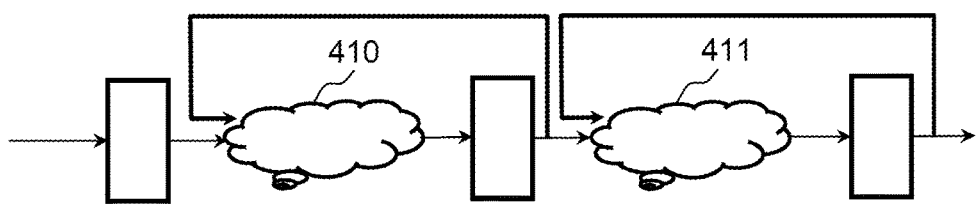
FIG. 4b, a schematic of a circuit comprising a plurality of functional logic blocks each with a feedback loop.

In circuits providing functions with feedback loops corresponding to recursive functions, certain intermediate or output signals are reused upstream, thus forming what are called feedback loops. In this particular case, the state of the circuit generally depends on an infinitely long history of competing input signals. A typical example of a recursive digital circuit is the family of the IIR filters. FIG. 4b schematically shows a circuit comprising processing operations 410, 411 with feedback loops.

Figure 5:
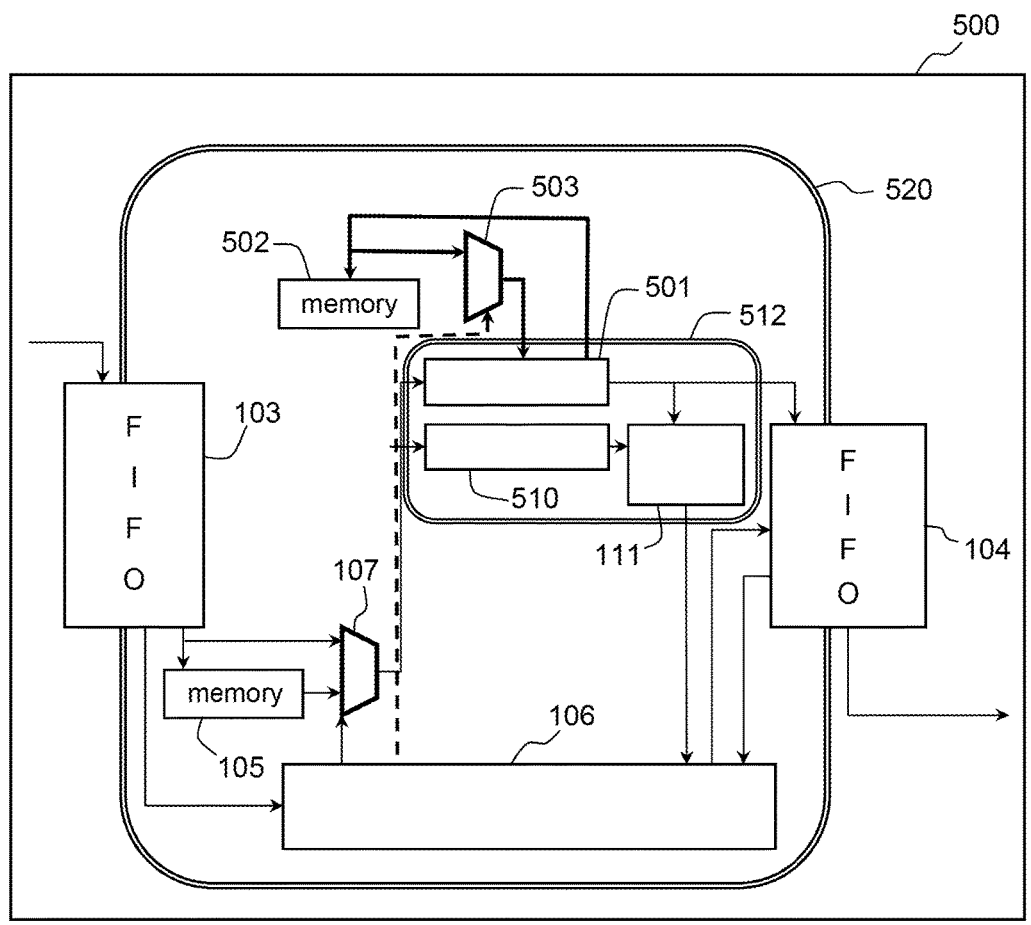
FIG. 5, a diagram of a variant embodiment of the digital integrated circuit according to the invention, said circuit being suitable for functions employing a feedback loop.

FIG. 5 shows a schematic of a variant embodiment of the invention that relates to a digital integrated circuit comprising a functional logic block 501 providing a recursive function with an internal feedback loop. Elements that have been given the same numerical references in FIGS. 1 and 5 are identical and are managed in the same way as in the case corresponding to protection of constant-latency functions.

To adapt the invention to protection of feedback-loop-containing functions, the device for correcting by replay may be adapted in order to allow it to restore the internal state of the function from input data obtained beforehand and archived values of the various signals that are fed back upstream within the functional block 501 to be protected.

To be able to protect a functional logic block 501 including one or more internal feedback loops, this block 501 is converted in order to implement the one or more feedback loops externally, i.e. outside of the block 501, and to make these one or more external loops openable. An external loop is opened by means of a multiplexer 503 that selects data from the second buffer memory 502.

Thus, the circuit 500 according to this variant embodiment of the invention comprises, in addition to the elements already described with reference to FIG. 1, for each signal to be fed back, a second buffer memory 502 associated with a second multiplexer 503 that is controlled by the logic control unit 106. The second multiplexer 503 is controlled in order to alternatively select either data from downstream of the internal feedback loop of the functional logic block 501, or data archived in the second buffer memory 502, which correspond to the data from downstream of the internal feedback loop of the functional logic block 501 at a time prior to the appearance of an error. The multiplexer 503 is connected to a second input of the block 501 in order to inject the data to be fed back upstream in the functional logic block 501. With reference to FIG. 5, the multiplexer 503 selects the output of the second buffer memory 502 during the first phase $\phi_1$ and the specific output of the block 501 during the phase $\phi_2$ or the phase $\phi_3$. The multiplexer 503 may be replaced by any other equivalent means allowing the logic control unit 106 to select the data to be fed back, these data being obtained either from the second buffer memory 502, or from the source downstream of the internal feedback loop of the functional logic block 501.

The converted functional logic block 501 has a specific output and input for extracting the data from the function to be fed back and for injecting upstream the extracted data to be fed back, respectively. This allows the feedback loop to be positioned outside of the circuit 501, with a view to archiving the sequence of the signal to be fed back and to allowing a prior sequence of the signal to be fed back to be injected.

Figure 6A:
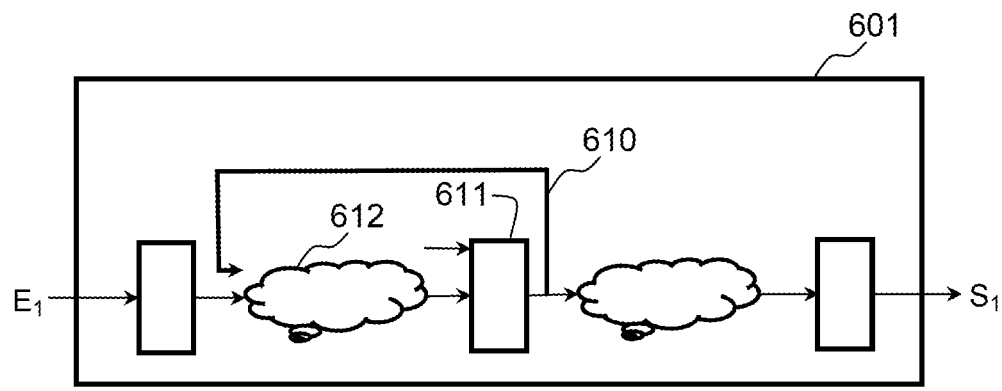
FIGS. 6a, 6b and 6c, three schematics illustrating the conversion of a functional logic block comprising an internal feedback loop into a functional logic block for which the feedback loop is made external and openable.
Figure 6B:
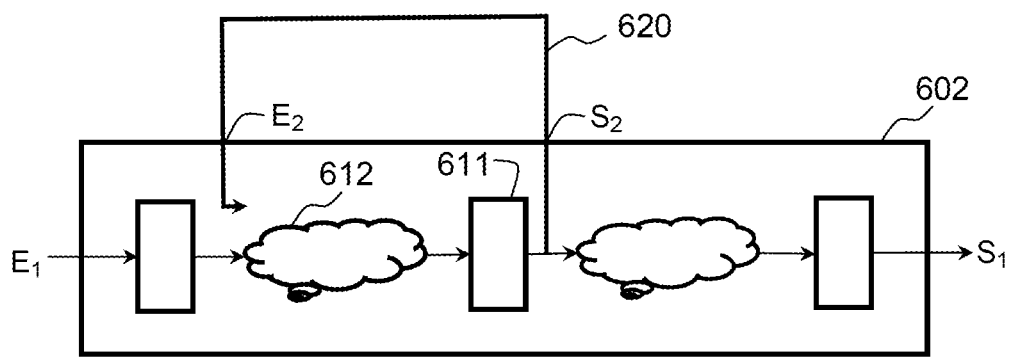
Figure 6C:
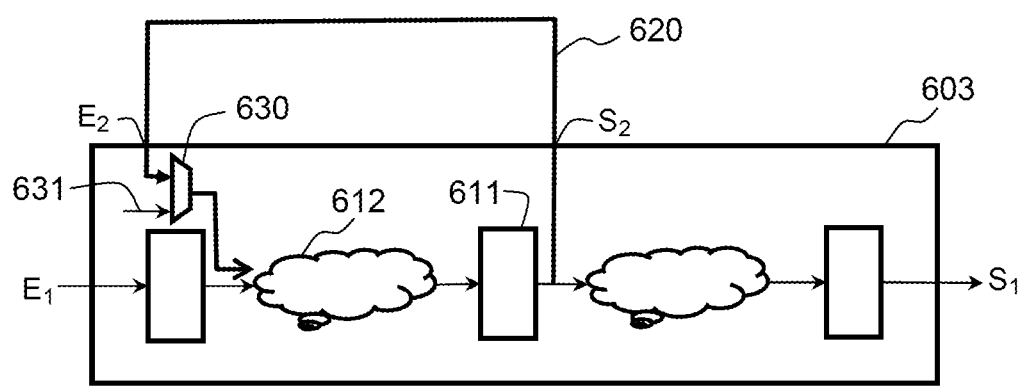

This principle is better illustrated in FIGS. 6a, 6b and 6c, which schematically show, via three schematics, the conversion of a functional logic block 601 comprising an internal feedback loop into a functional logic block 603 in which the feedback loop has been made external and openable.

FIG. 6a shows a functional logic block 601 comprising an internal feedback loop 610 the role of which is to reinject data output from the register 611 into the input of the combinational logic 612. The functional logic block 601 comprises an input $E_1$ and an output $S_1$.

FIG. 6b shows a first conversion of the block 601 into a converted block 602 in which the internal feedback loop 610 has been made external 620. To do this, the block 602 has been provided with a second input $E_2$ and a second output $S_2$. The second output $S_2$ receives data output by the register

611. The second input $E_2$ allows data to be injected from the external feedback loop 620 into the input of the combinational logic 612.

FIG. 6c shows a second conversion of the block 602 into a converted block 603 according to the invention. This block 603 is modified in that it includes a multiplexer 630 for connecting the second input $E_2$ either to the external feedback loop 620, in which case the block 603 operates in a closed-loop mode, or to another source 631, in which case the block 603 operates in an open-loop mode.

The principle illustrated in FIG. 6c is used to protect the functional logic block according to the invention.

Returning to FIG. 5, regarding the protecting resources specific to functions with a feedback loop, the second buffer memory 502 archives the sequence of the N preceding values of the data extracted from the feedback loop. Read and write access to this second buffer memory 502 is managed in the same way as the first buffer memory 105 connected to the input of the protected functional block 501. The depth N here corresponds to the number of stages of registers in cascade in the function performed by the block 501, ignoring the loops (considered to be open). This buffer memory 502 may be small in size depending on the position of the point of upstream injection of the signal of the feedback loop relative to the output of the function. The size of the buffer memory 502 is at most equal to the number of stages of registers, when the output is connected to the input stage. Although in FIG. 5, one second buffer memory 502 and one second multiplexer 503 have been shown, in general as many assemblies of buffer memories 502 and multiplexers 503 are required as there are feedback loops. The dimensions of these buffer memories for archiving the data obtained from the feedback loop are chosen to allow for the case of simple errors and bursts of errors. Thus, the circuit modification shown in FIG. 5 allows feedback-loop-containing functions to be taken into account.

The dimensions of the input, output and intermediate FIFO memories are set in the same way as for constant-latency functions, the external feedback loops of the function being considered open. Conceptually, opening the loops allows the case of a constant-latency function to be returned to. In practice, the fact of placing the feedback loops outside the functional logic block 501, by means of an input and an output specific for the source and the point of injection of the signal to be fed back, amounts to converting the feedback-loop-containing function into a constant-latency function without a loop but with a plurality of outputs and a plurality of inputs.

The invention has many advantages with respect to prior-art solutions. It allows transient errors affecting one or more functions implemented in a digital integrated circuit to be corrected in a way that is transparent to the other functions located upstream or downstream. In other words, continuity of service is ensured, i.e. there is no impact on the rhythm of execution of the processing operations and the sequencing of samples within the digital integrated circuit. The mechanism for protecting from errors that is provided by the invention does not significantly disrupt the nominal operation of an integrated circuit, and, in particular, it does not significantly slow the execution frequency thereof and does not degrade the processing performance thereof. The invention allows all the logic resources of a digital integrated circuit to be protected, i.e. both sequential logic and combinational logic. It is not subject to constraints with respect to the technology used to produce the integrated circuit. It has a lower logic complexity and a lower power dissipation than conventional solutions, in particular solutions based on triple modular redundancy (TMR). The proposed mechanism allows errors to be corrected as soon as possible and does not simply mask them. Even if a transient error impacts the whole of the error-detecting logic unit 102, the error-detecting logic unit 102 will potentially signal a false error (false positive), which will lead to a needless replay of the functional logic block 101, but this is of no concern. Choosing the dimensions of the input and output FIFO memories of the device according to the invention allows the correcting capacity of the device to be selected depending on an envisaged worst-case scenario. For example, if a burst of p errors spread over a short length of time is anticipated, the dimensions of the FIFO memories may be chosen on the basis of the parameter p and of the latency of the functional logic block to be protected.

The invention allows a functional logic block 101 to be protected from transient errors. Moreover, the input FIFO memory 103 and output FIFO memory 104 and the buffer memories 105 and logic control unit 106 may, moreover, also be protected by known protecting means, for example using error-correcting codes or a triple-modular-redundancy (TMR) method.

Although the invention has been described in the context of single-rate processing operations, i.e. for which the rhythm at the input interface of the block 120 and the rhythm at the output interface are identical, it applies identically to multi-rate processing operations, i.e. for which the rhythms at the input and output interface are different.

The invention claimed is:

1. A digital integrated circuit comprising:
   a logic array comprising a functional logic block,
   a transient-error-detecting logic unit for detecting transient errors affecting the functional logic block,
   an input FIFO memory for supplying the functional logic block with first samples,
   an output FIFO memory for receiving second samples output from the functional logic block,
   a buffer memory that is supplied with third samples by the input FIFO memory; and
   a logic control unit configured to:
      control read access to the input FIFO memory and write access to the output FIFO memory;
      and that is configured, when an error is detected by the transient-error-detecting logic unit;
         to reset the transient-error-detecting logic unit and the functional logic block,
         to suspend write access to the output FIFO memory, and
         to switch an input of the functional logic block to an output of the buffer memory.

2. The digital integrated circuit according to claim 1, comprising a multiplexer for connecting an input of the functional logic block to the input FIFO memory or to the buffer memory.

3. The digital integrated circuit according to claim 2, wherein the logic control unit is configured to control the multiplexer depending on a result of the transient-error-detecting logic unit.

4. The digital integrated circuit according to claim 1, wherein a frequency of a clock within the logic array is higher than an average write frequency in the input FIFO memory.

5. The digital integrated circuit according to claim 4, wherein an activity within the logic array is made irregular.

6. The digital integrated circuit according to claim 4, wherein a rhythm Ra of processing operations within the logic array is controlled by the logic control unit by means of an activation signal.

7. The digital integrated circuit according to claim 4, wherein a rhythm Ra of processing operations within the logic array is controlled by the logic control unit depending on a fill level of the output FIFO memory or on whether or not the transient-error-detecting logic unit has signalled that it has detected an error.

8. The digital integrated circuit according to claim 7, wherein the logic control unit is configured to modify the rhythm Ra of processing operations within the logic array depending on a comparison of the fill level of the output FIFO memory to at least three thresholds.

9. The digital integrated circuit according to claim 1, wherein the input FIFO memory and the output FIFO memory are dimensioned to store at least $p*L_p$ data, where p is a tolerable maximum number of consecutive errors affecting in a burst the functional logic block and $L_p$ is an estimate of a latency of the functional logic block.

10. The digital integrated circuit according to claim 1, wherein a size of the buffer memory depends on a latency of the functional logic block.

11. The digital integrated circuit according to claim 1, wherein the transient-error-detecting logic unit comprises a redundant functional logic block and a unit for comparing results produced by the functional logic block and the redundant functional logic block, respectively.

12. The digital integrated circuit according to claim 1, wherein the functional logic block is of constant latency.

13. The digital integrated circuit according to claim 1, wherein the functional logic block is provided with at least one second input and at least one second output in order, when they are connected together, to produce at least one external feedback loop, and said logic array comprises at least one second buffer memory that is supplied with fourth samples by said at least one second output of the functional logic block, the logic control unit being configured, when an error is detected by the transient-error-detecting logic unit, to switch said at least one second input of the functional logic block from said at least one second output of the functional logic block to the output of said at least one second buffer memory.

14. The digital integrated circuit according to claim 13, wherein said logic array comprises at least one second multiplexer for connecting said at least one second input of the functional logic block to said at least one second output of the functional logic block or to said at least one second buffer memory.

15. The digital integrated circuit according to claim 14, wherein the logic control unit is configured to control the second multiplexer of each array depending on a result of the transient-error-detecting logic unit.

16. The digital integrated circuit according to claim 15, comprising a plurality of said logic arrays and wherein an input FIFO memory of a first logic array is an output FIFO memory for a second logic array located upstream.

* * * * *